Feb. 5, 1935.     P. H. HERRING     1,989,860
CONTROL APPARATUS FOR LIQUID FUEL BURNERS
Filed Sept. 27, 1933    7 Sheets-Sheet 1

INVENTOR
P. H. HERRING
BY
ATTORNEY

Feb. 5, 1935.  P. H. HERRING  1,989,860
CONTROL APPARATUS FOR LIQUID FUEL BURNERS
Filed Sept. 27, 1933   7 Sheets-Sheet 2
Fig. 2.
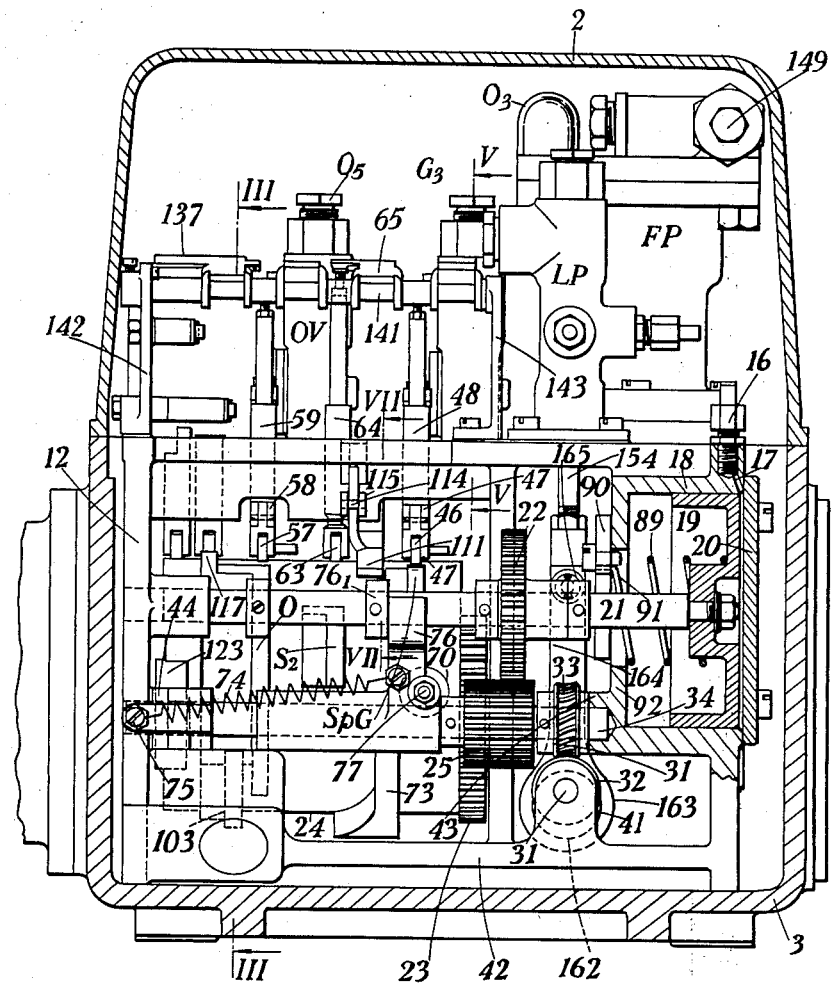
INVENTOR
P. H. HERRING
BY
ATTORNEY Feb. 5, 1935. P. H. HERRING 1,989,860
CONTROL APPARATUS FOR LIQUID FUEL BURNERS
Filed Sept. 27, 1933   7 Sheets-Sheet 3
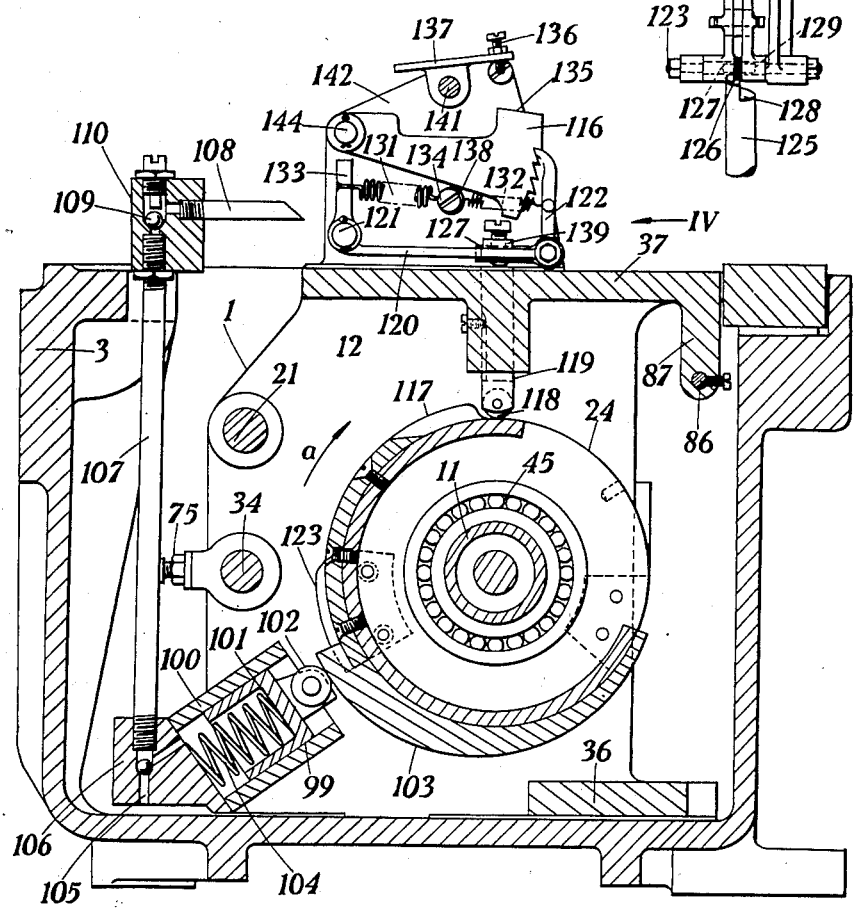

Feb. 5, 1935. P. H. HERRING 1,989,860
CONTROL APPARATUS FOR LIQUID FUEL BURNERS
Filed Sept. 27, 1933 7 Sheets-Sheet 4
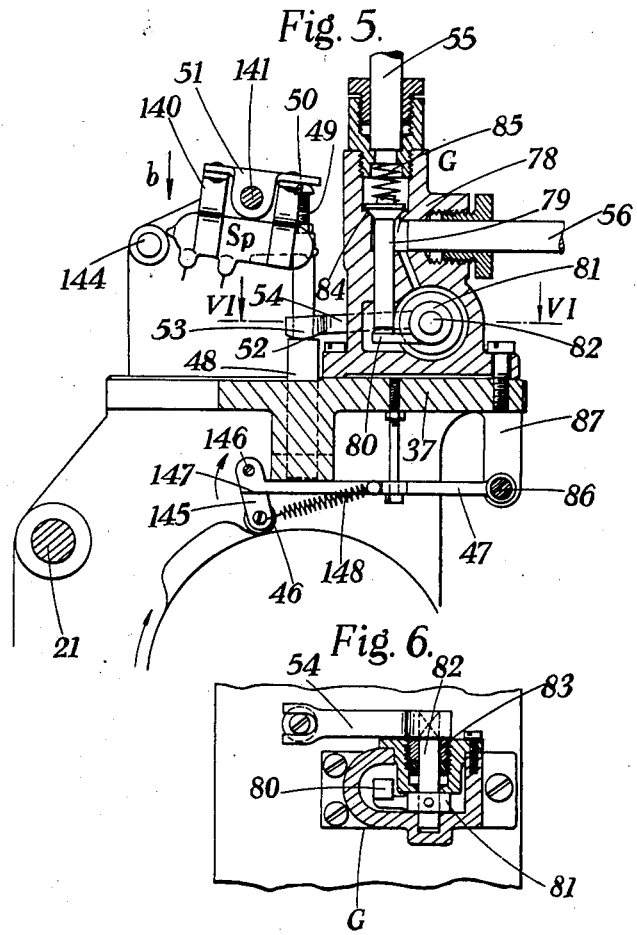
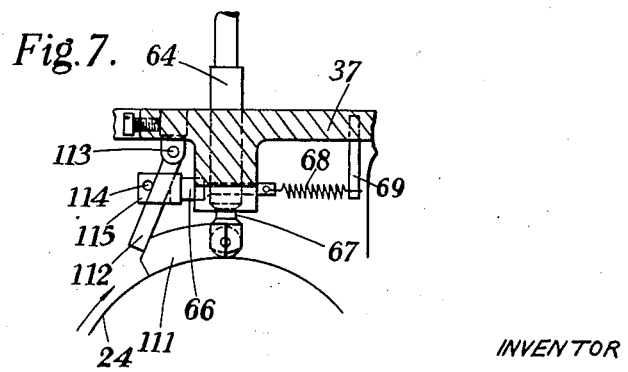
INVENTOR
P. H. HERRING
BY
ATTORNEY Feb. 5, 1935. P. H. HERRING 1,989,860
CONTROL APPARATUS FOR LIQUID FUEL BURNERS
Filed Sept. 27, 1933 7 Sheets-Sheet 5
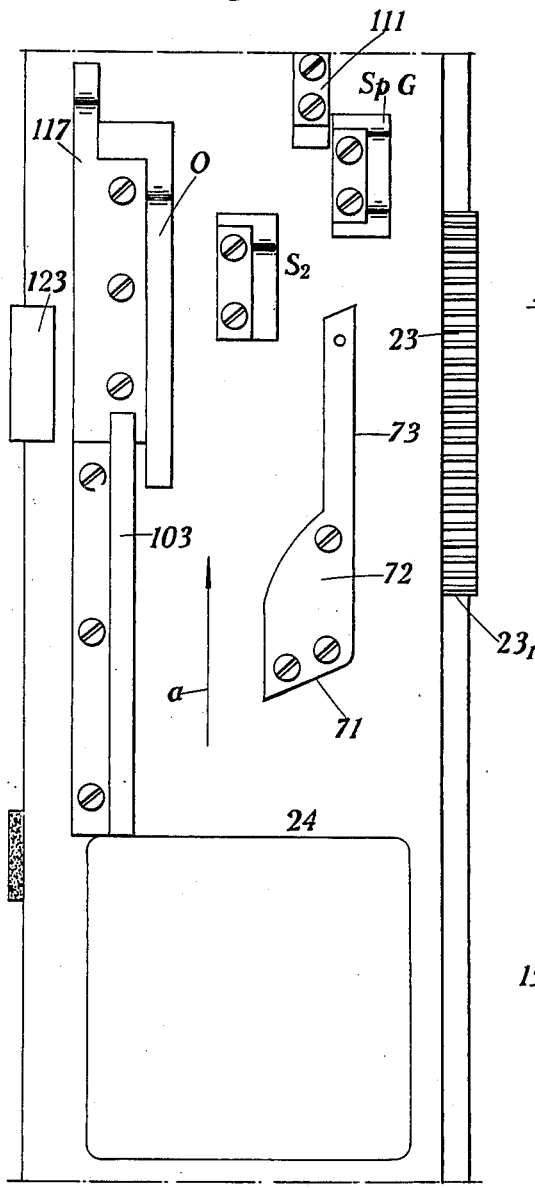
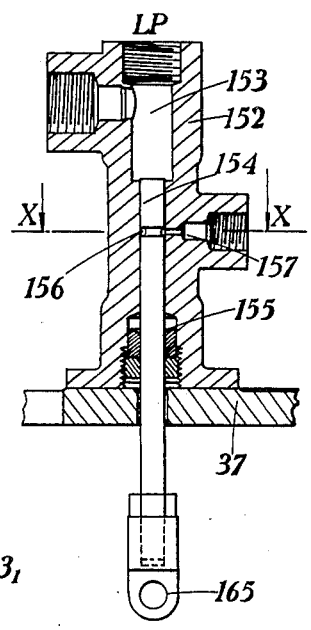
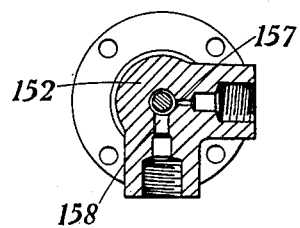
INVENTOR.
P. H. HERRING
BY
ATTORNEY

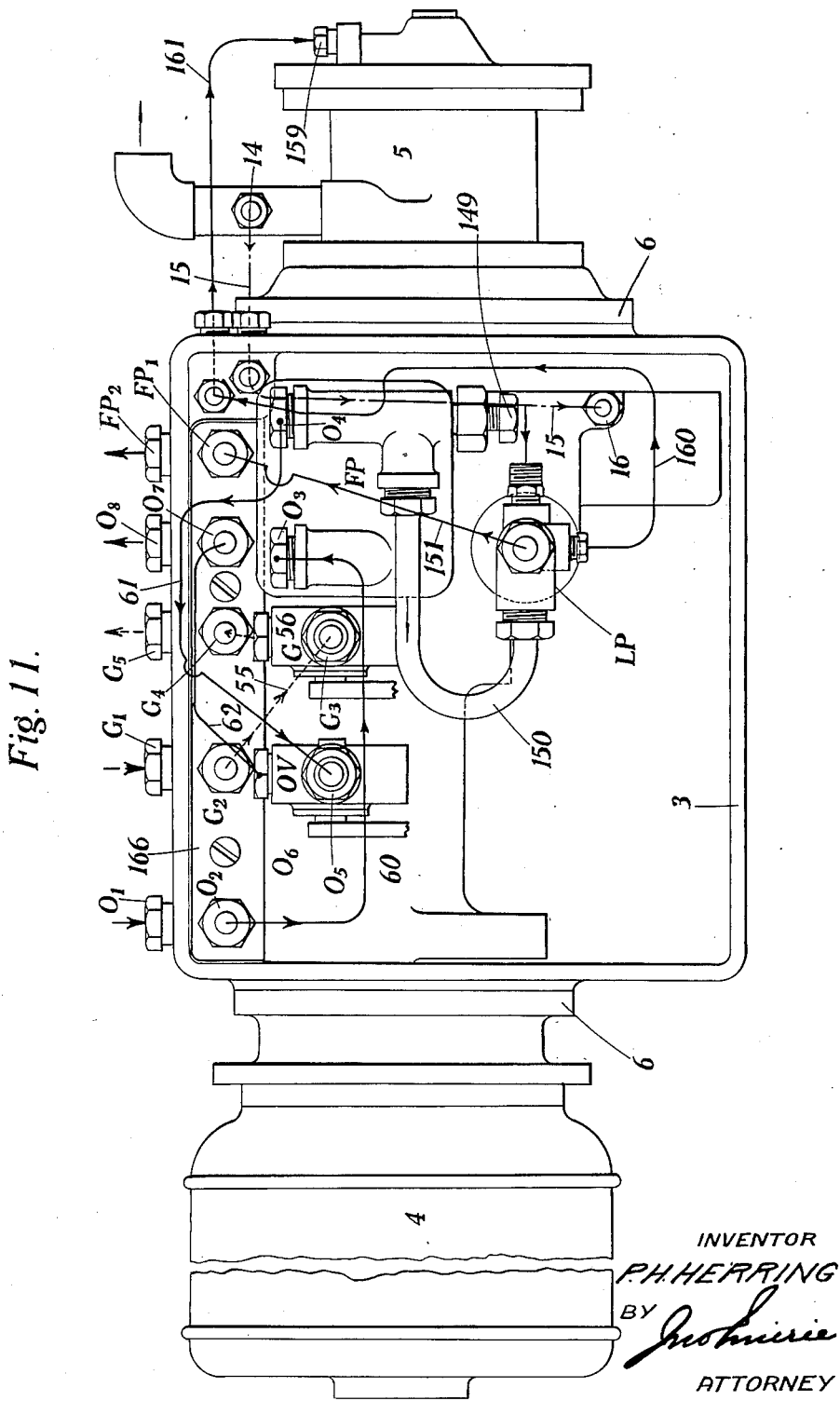

Feb. 5, 1935.   P. H. HERRING   1,989,860
CONTROL APPARATUS FOR LIQUID FUEL BURNERS
Filed Sept. 27, 1933    7 Sheets-Sheet 7

INVENTOR
P.H. HERRING
BY
ATTORNEY

Patented Feb. 5, 1935

1,989,860

UNITED STATES PATENT OFFICE 1,989,860

CONTROL APPARATUS FOR LIQUID FUEL BURNERS

Percy Henry Herring, London, England, assignor to G. N. Haden & Sons Limited, London, England, a British company Application September 27, 1933, Serial No. 691,204 In Great Britain October 3, 1932

12 Claims.  (Cl. 158—28)

This invention relates to apparatus for the control and ignition of liquid fuel burners arranged in boiler and like furnaces.

The primary object of the invention resides in the provision of apparatus in which the liquid fuel is automatically ignited at start up of the furnace and at a fresh start up subsequently to the flame being discontinued owing to the operation of a control thermostat or the like or to the presence of a fault such as water in the fuel.

Another object of the invention is the provision of control apparatus which becomes inoperative in the event of its making a predetermined number of abortive attempts in succession to ignite the fuel.

Another object of the invention comprises control apparatus with a spark ignition device or a flame ignition device for the liquid fuel which devices are operated for a short time and then cease to function until re-ignition of the fuel is required.

Another object of the invention relates to the provision of control apparatus in which a liquid fuel control valve is automatically closed in the event of the burner not being required or the apparatus or burner developing a fault; and in which the valve is automatically opened when the burner is required or when the fault has been cleared.

A further object of the invention is the provision of a control apparatus incorporating electric control switches in which certain of the said switches are dependent each on at least one other so that likelihood of damage to the apparatus and associated plant in the event of switch failure is lessened. Certain of said control switches may comprise parts of control devices known as stackstats, hydrostats, and the like, a stackstat being a switch which, as its name implies, is located in the chimney stack or flue of the furnace and, therefore, is likely to have its functioning adversely affected by a coating of soot or the like.

A further object of the invention comprises the provision of a control device adapted to effect control operations in a predetermined sequence irrespectively of whether the furnace is being started from cold or is being restarted subsequently to the development of a fault. Such device comprises a cam drum rotated by an electric motor and a number of tappets which are successively actuated. The first tappet effects the operation of ignition apparatus such as an electric spark and/or a gas flame. A second tappet effects the opening of an oil flow valve so that oil issues from the burner in the furnace and is ignited, shortly after which the ignition apparatus becomes inoperative. A fourth tappet, subsequently to the oil being ignited, effects the release of a hold-on pawl previously raised by a third tappet; but this hold-on pawl is not released unless the oil is ignited because an electric driving motor for the device, owing to its being controlled thermostatically after initially driving the drum, becomes de-energized in the absence of heat from the burner and the cam drum does not make a sufficiently complete movement to affect the fourth tappet. It results, therefore, that at each unsuccessful attempt of the device to ignite the oil the third tappet causes a rack to be advanced one step at a time, and after a predetermined number of steps the rack open-circuits the electric motor and prevents the gear making further attempts at ignition until the fault is rectified. It will be understood that at each de-energization of the motor the cam drum returns to its starting position, for example, it is returned under spring action, and the device effects re-energization of the motor for a limited time.

A further object of the invention comprises a self-contained device achieving one or more of the above objects and incorporating a compressor, a fuel pump and a lubricating pump all driven from the motor which drives the device, air from the compressor being utilized to effect engagement of the motor with part of the device for the purpose of causing the device to effect a cycle of starting operations.

In the accompanying drawings:—

Fig. 1 is a sectional elevation of the lower part of the control device taken in a plane containing the longitudinal axis of the main shaft, the driving motor and compressor being omitted;

Fig. 2 is a vertical sectional elevation of the control device taken through a plane containing the axis of the air piston 19 that slides the idler wheel 22 into mesh with a toothed segment 23 on the cam drum 24: the compressor and motor and details that would not show clearly are omitted from this figure;

Fig. 3 is a sectional side elevation on the line III—III of Fig. 2;

Fig. 4 is a view, looking in the direction of the arrow IV (Fig. 3), of the safety mechanism;

Fig. 5 is a vertical sectional elevation taken on the line V—V, Fig. 2, this view showing, more particularly, a control valve and parts closely associated therewith;

Fig. 6 is a sectional plan view, taken on the line VI—VI, of the control valve shown in Fig. 5;

Fig. 7 shows a detail on the line VII—VII, Fig. 2;

Fig. 8 illustrates a development of the cam drum;

Fig. 9 is a vertical sectional view of a lubricating pump employed in the mechanism;

Fig. 10 is a sectional plan view of the said pump taken on the line X—X, Fig. 9;

Fig. 11 is a plan view of the device and shows, more particularly, the pipe connections between the several elements, the scale being somewhat smaller than that to which the preceding figures are drawn;

Figure 1:
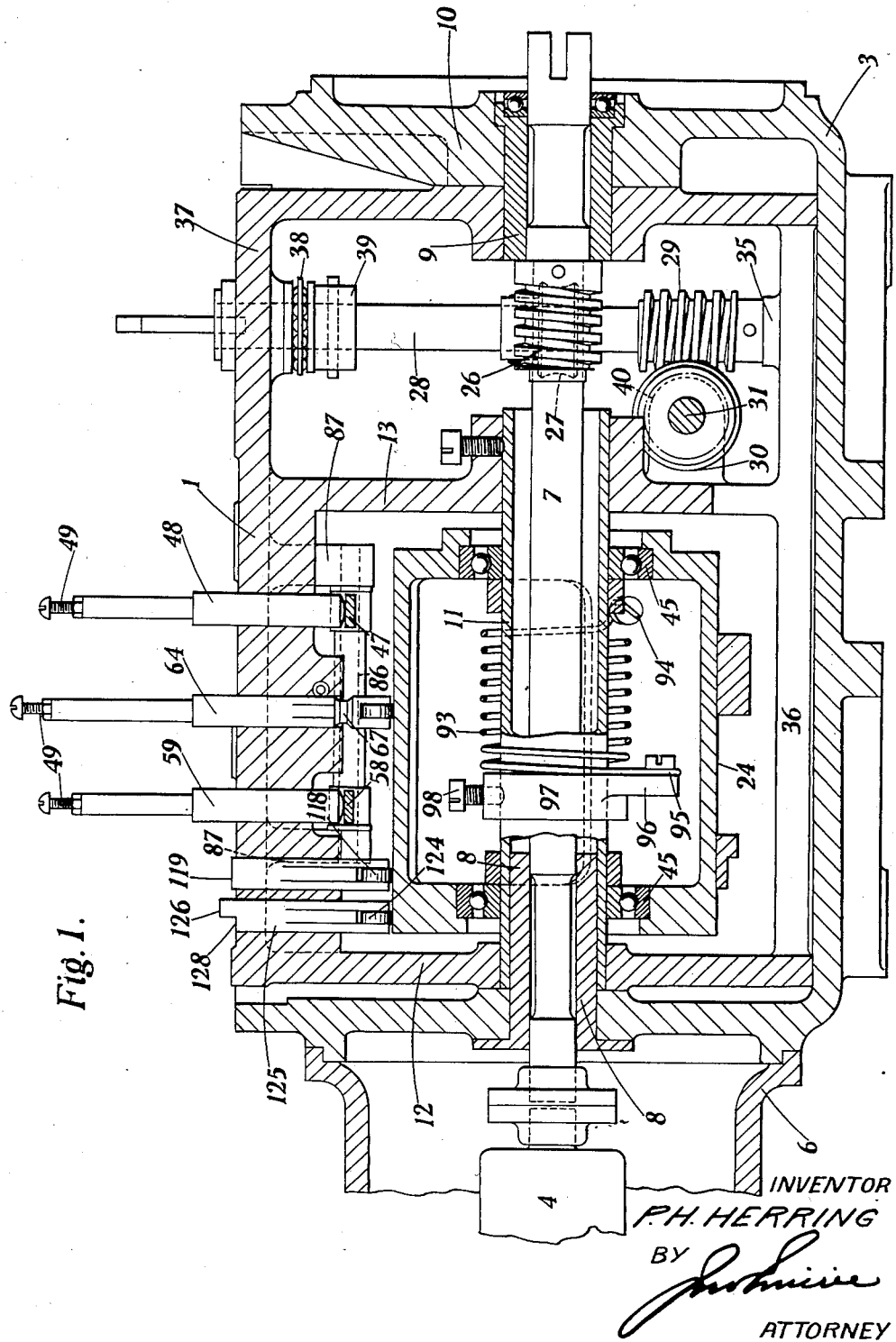

In this example the device comprises a cast frame 1 supporting the control mechanism proper, and a casing comprising a cover part 2 and base part 3 which latter supports at one of its ends an electric motor 4 and at its other end a compressor 5, the motor 4 and compressor 5 being secured in place by means of flanged fittings 6, 6 of known form. The motor and compressor are directly coupled by means of a main shaft 7 extending through the frame 1 and slightly beyond the ends of the base part 3 and being supported near its ends by bushings 8 and 9. The bushing 9 is fitted in aligned bores in the end wall 10 of the base part 3 and the adjacent end of the frame 1, and the bushings 8 is fitted in a bore in the opposite end wall of the base part 3 and extends into a bearing tube 11, said tube being supported at one end in a bore in the end wall 12 of the frame 1 and at its other end in a bossed web 13 of the frame 1.

When the motor 4 is energized the compressor 5 is driven through the intermediary of the shaft 7. Most of the air from the compressor passes to the burner with which the apparatus is associated and some air, through a union 14 on the compressor outflow pipe, piping 15, union 16, and a bore 17 in the wall of a cylinder 18, enters the cylinder and forces a piston 19 (Fig. 2) towards the left hand end of the cylinder, the other end of the cylinder being closed by a cover plate 20. The cylinder is cast integrally with the frame 1. The piston 19 is rigid with a shaft 21, the end of which remote from the piston is slidable in a bore formed in a bossed part of the end wall 12 of the frame 1. This sliding movement of the piston 19 and shaft 21 carries a toothed wheel 22 into mesh with a toothed segment 23 on a cam drum 24 with the result that the cam drum is turned in the direction of the arrows $a$ shown in Figs. 3, 5, 7 and 8 because the toothed wheel 22 meshes with a pinion 25 that is constantly driven from the main shaft 7 through a gear train comprising a worm 26 pinned to the shaft 7, a worm wheel 27 meshing with 26 and pinned to a vertical pump shaft 28, a worm 29 also pinned to shaft 28, a worm wheel 30 meshing with 29 and fixed on a transverse shaft 31, a worm 32 fixed near the forward end of the shaft, and a worm wheel 33 pinned to a shaft 34 to which pinion 25 is fixed.

The lower end of the pump shaft 28 is borne by a boss 35 on a longitudinal web 36 of the frame 1, whilst the upper end of the said shaft is borne by a top web 37 of said frame and is prevented from rising vertically owing to the provision of a thrust bearing 38 arranged between a boss on web 37 and a thrust collar 39 fixed to the shaft. The shaft 31 is borne at its rear end in a bore in a lug 40 extending sidewardly from the web 13, and the front part of said shaft is borne by a vertical lug 41 extending upwardly from a second longitudinal web 42 near the front of the frame 1. One end of shaft 34 is supported in a boss 43 projecting sidewardly of the cylinder 18, and the other end of this shaft is arranged within a bore in a boss 44 on wall 12.

The drum 24 is turnably supported on tube 11 by means of ball bearings 45, 45 at the ends of the said drum. Owing to the drum being turned by the toothed wheel 22 a cam Sp. G engages a roller 46 and tilts a tappet lever 47 in such a manner that the lever raises a tappet 48. The upper end of tappet 48, which end comprises an adjusting screw 49, is normally in contact with one end 50 of a tiltably-mounted switch carrier 51, and a shoulder 52 on tappet 48 has normally bearing against it the forked end 53 of a valve lever 54. Hence, when tappet 48 is lifted in the manner previously described, the carrier 51 is partially turned in the direction of the arrow $b$ so that a mercury switch Sp. is closed and a valve G is opened.

Figure 12:
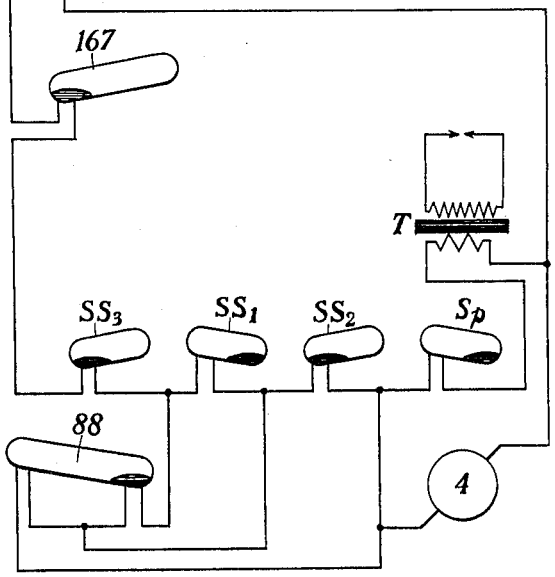
Figs. 12 and 13 show wiring diagrams used with the control gear, Fig. 12 being for an alternating current supply and Fig. 13 for a direct current supply.
Figure 13:
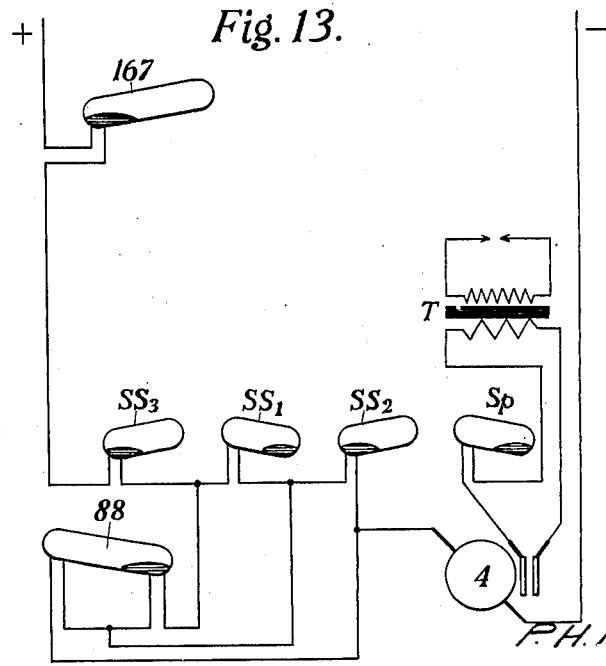

Owing to the opening of the valve G gas which enters the union $G_1$, passes to the valve G through unions $G_2$ and $G_3$ connected by a pipe 55, and leaves the valve through pipe 56 and unions $G_4$ and $G_5$ whence it passes to a nozzle adjacent the burner. The gas, when issuing from said nozzle, is ignited by an electric spark produced owing to the closing of switch Sp. which controls the flow of alternating current to the secondary winding of a step-up transformer T. In Fig. 12 the alternating current is taken directly from the supply mains, and in Fig. 13 it is taken from slip rings on the motor 4.

The cam drum continues to turn and the cam Sp. G keeps tappet 48 raised and a cam O engages a roller 57 so that a tappet lever 58 and therefore a tappet 59 similar in construction to tappet lever 47 and tappet 48 are lifted. This movement of tappet 59 causes an oil valve OV to open and a safety switch $SS_1$ to close, the said switch $SS_1$ being in the motor supply circuit. Fuel oil enters through union $O_1$ and passes to a fuel pump FP through unions $O_2$ and $O_3$ connected by a pipe 60, passes from the pump to the valve through unions $O_4$ and $O_5$ connected by a pipe 61, and passes to the burner by way of unions $O_6$ and $O_7$ connected by means of a pipe 62 and a union $O_8$. The fuel, mixed with air from the compressor, is ignited as it leaves the burner nozzle by the gas flame ignited by the electric spark in the manner previously described. Soon after ignition of the oil has taken place roller 46 rides along the tail of cam Sp. G so that the gas supply and spark are discontinued. Further turning of the drum brings a cam $S_2$ into alignment with a roller 63 at the lower end of a tappet 64 with the result that this tappet is lifted and tilts a switch carrier 65 to open-circuit a mercury switch $SS_2$. The switch $SS_2$ is in parallel with the left hand contacts of a thermally-actuated switch 88 which continues to supply current to the motor owing to the burner flame having tilted the switch to close the said contacts. The tappet 64 is kept in its raised position (so that switch $SS_2$ is kept open-circuited) during the rest of the turning movement of cam drum 24 owing to the provision of a plunger 66 (Fig. 7) which is pulled into a groove 67 on tappet 64 by means of a spring 68 anchored to a pin 69 depending from the web 37.

The cam drum continues to turn, the cam O keeping tappet 59 raised, and plunger 66 keeping tappet 64 raised in spite of the fact that cam S₂ has moved past roller 63, and eventually a roller 70 engages a ramp 71 at the end of a block 72 fixed on the cam drum. During the turning movement of the cam drum the roller 70 is kept in contact with the plane face 73 of the block 72 by means of a spring 74 which is anchored at 75 and secured at its opposite end to a stirrup 76 on which roller 70 is mounted, the mounting comprising a pin 77 passing through the roller and secured to the stirrup. When the roller 70 engages the ramp portion 71, with the cam drum in its furthermost point of rotation in a clockwise direction, cam O still holds tappet 59 raised, with the valve OV open and the switch SS closed. When 70 and 71 engage, the spring 74 immediately pulls the stirrup 76 to the left, with the result that the cam drum 24 is given a rapid partial rotation in the direction of arrow $a$ and the end 23' of the segment 23 is freed from the toothed wheel 22.

The motor, compressor and burner continue to operate until shut down or unless a fault develops at the burner.

The valves G and OV above referred to are of similar construction and so are the tappet levers 47 and 58. The valves each comprise a body casting 78 with a vertical bore containing a spindle 79. The lower end of the spindle bears against the rounded end of a lever 80 rigid with a collar 81 fixed to a spindle 82. This latter spindle passes through a gland 83 in the side of the valve and is fixed to a tappet arm (such as 54, Fig. 5). When arm 54 is operated by tappet 48 or 59 the spindle 82 is partially turned, with the result that the lever 80 lifts the head of spindle 79 from seat 84 and fluid is able to flow through the valve. When tappet 48 or 59 is free a spring 85 pressing against the head of spindle 79 recloses the valve and restores the parts (including tappet levers 47 and 58) to their initial positions. The tappet levers are supported at their ends remote from the tappets by means of a pin 86 extending between two lugs 87, 87 depending from the rear of web 37.

If the motor becomes de-energized, either because it is desired to shut the plant down or because the burner has ceased to function, the toothed wheel 22 and the cam drum 24 return to their initial positions in readiness for a subsequent start up. The running of the plant is discontinued, either by intentional operation of a switch (not shown) or by stack switch 88 returning from a position in which its left hand contacts are closed to the position shown in the drawings, the said positioning in which the left contacts are closed being effected by heat from the burner.

When the motor is de-energized the air pressure in cylinder 18 falls so that a spring 89 is able to return the toothed wheel 22 to its initial position, where it leaves a clear path for the return of toothed segment 23, the return of this segment taking place with the return of cam drum 24. A collar 76' is rigid with shaft 21, and when shaft 21, in returning toothed wheel 22 to the position shown in Fig. 2, moves to the right the collar 76' engages stirrup 76 and returns the stirrup and roller 70. The spring 89 is located between the inner side of piston 19 and the adjacent side of a bar 90 extending across an opening 91 in an end wall 92 of the cylinder, said opening 91 providing a passage for shaft 21 and the spring. This spring 89 was compressed when the piston was subjected to air pressure and returns the parts to the positions shown in the absence of air pressure acting on the piston.

Return of the cam is brought about by means of a coil spring 93 anchored at one end 94 to the inside of the drum and at the other end 95 to a lug 96 on a collar 97 non-rotatably secured to the tube 11 by means of a set screw 98. The rate of the return movement is controlled by a dashpot 99. The dashpot comprises a cylinder 100, integral with the frame casting 1, and a piston 101 with a roller 102 bearing against a cam 103 on the drum 24. During the movement of the drum in the direction of the arrow $a$ the piston 101 is forced towards the axis of the drum by means of a spring 104 owing to the face of cam 103 receding from the cylinder 100, oil being sucked into the cylinder by way of a non-return passage 105 in a block 106. This oil is supplied from a sump comprising the base part 3. On the return movement of the cam (in a direction opposite to arrow $a$) the piston 101 is forced inwardly of cylinder 100 and the oil therein is discharged through a vertical tube 107 and a nozzle 108, but the rate of this discharge and, therefore, the rate of the return movement of the cam is controlled by an adjustable ball valve 109 in a block 110 acting as a union between the upper end of 107 and one end of nozzle 108. The oil leaving the nozzle 108 returns to the sump.

Just before the cam drum 24 reaches the end of its return movement a cam 111 thereon effects the withdrawal of the plunger 66 and allows the tappet 64 to drop to its initial position and the switch SS₂ to reclose. The said withdrawal is effected by the cams engaging the lower end of a finger 112, which finger is pivoted at its upper end to a small block 113 and operates between the yoke of, and a pin 114 extending across, the forked head 115 of plunger 66.

In the event of the spark not igniting the gas at the nozzle adjacent the burner, or the ignited gas not igniting the oil fuel mixture issuing from the burner, or the burner otherwise failing to operate, the cam drum will rotate and the tappets 48, 59 and 64 will be operated in the manner previously described: but the cam drum will not complete its movement because immediately tappet 64 is operated the safety switch SS₂ is open-circuited and, stack switch 88 having remained in the position shown in the drawings owing to the absence of heat in the furnace flue or stack, current will be unable to reach the motor and the motor will stop. The pinion 22 and the cam drum will again return to the starting position and the motor will be energized immediately when cam 111 effects the release of the tappet 64.

The apparatus will make a further attempt to start the burner: if successful the cam drum will revolve until it is thrown out of gear with the pinion 22 in the manner previously described.

If second and third attempts at fuel ignition fail the whole device is put out of operation owing to the provision of a safety device, manual assistance then being necessary to restart the device.

The safety device is shown, more particularly, in Figs. 2, 3 and 4. It comprises a ratchet arm 116. Every time cam drum 24 turns in the direction of arrow $a$ a cam 117 engages a roller 118 at the lower end of a tappet 119 and lifts the said tappet. This raising of the tappet tilts an arm 120 on a stud 121 and causes a pawl 122 to lift the ratchet arm 116 through the pitch between two successive teeth. Tappet 119, lever 120, pawl 122 and the ratchet arm 116 are held in the raised position whilst the drum continues its normal rotation and finally a cam 123 engages a roller 124 at the lower end of a tappet 125 and lifts this tappet. The upper end of the tappet is stepped, the higher step 126 being located beneath an arm 127 rigid with and at right angles to the pawl 122, and the lower step 128 being located beneath a similar arm 129 rigid with a hold-on pawl 130. When tappet 125 is lifted in the manner previously described step 126 engages arm 127 and turns the pawl 122 away from 116, whilst step 128 engages arm 129 and releases the hold-on pawl from 116. The ratchet arm 116 is thus allowed to drop. When the drum returns to its initial position tappets 119 and 125 return so that the parts are restored to the positions shown under the action of springs 131 and 132, spring 131 being located between an arm 133 rigid with lever 120 and a screw stud 134, and springs such as 132 (one spring to each pawl) being fixed each to 134, the other end of one to 122 and the other end of the other to 130. The above remarks apply to normal functioning.

If the cam drum 24 does not complete a normal turn (owing to the open-circuiting of switch $SS_2$ and the non-movement of switch 88 as previously described) cam 123 does not reach tappet 125, with the result that the ratchet arm 116 is lifted through one tooth after the first failure, a second tooth after a second failure, and a third tooth after a third failure. This brings a nose 135 on the ratchet arm 116 into contact with a set screw 136 on a switch carrier 137. Upon a fourth attempt on the part of the apparatus to start the burner the ratchet 116 is lifted a fourth time and this movement is conveyed to switch carrier 137 so that a switch $SS_3$ in the main supply circuit is opened and the motor de-energized until such time as the fault, whatever it may be, is rectified. The screw stud 134 is provided with an eccentric 138 for the purpose of adjusting the initial position of 116 with respect to the pawls 122 and 130, and the arm is provided with a set screw 139 to enable it to be adjusted with respect to the ratchet arm 116.

The switches Sp., $SS_2$, $SS_1$ and $SS_3$ are of the mercury tube type illustrated in Fig. 5. They are supported by clips such as 140 fixed to the carriers, and the carriers are freely rotatable on a rod 141. This rod extends from an end bracket 142 fixed to the top left hand end (Fig. 2) of the frame 1 to a bracket 143 located approximately above the web 13 and at the top of the frame 1. The bracket 142, in addition to supporting rod 141, supports a pivot 144 for the ratchet arm, the stud 121 and the screw stud 134.

For the purpose of preventing operation of tappets 48 and 59 when the cam drum returns to its starting position the rollers 46 and 57 are mounted in forks on fingers 145 pivoted at 146 to an arm 47 or 58. When the leading end of a cam engages roller 46 or 57 the levers are lifted and so are the tappets because fingers such as 145 are shouldered at 147 and, therefore, prevented from turning anti-clockwise (Fig. 5). On the return, however, of the cam drum 24 the fingers 145 are able to turn clockwise against the pull of light springs 148 so that the cams contacting with rollers 46 and 57 return inoperatively with respect to tappets 48 and 59.

The fuel pump FP is of known kind and is driven from the upper end of the vertical shaft 28.

For the purpose of adjusting the rate of flow of fuel to the burner the pump is provided with a by-pass controlled as to effective size by means of a ball (not shown) adjusted by means of a stud 149.

Oil that is by-passed is not conducted directly to the tank but is passed to a lubricating pump LP by way of a pipe 150 and passes thence, through a pipe 151, to a union $FP_1$ in communication with another union $FP_2$ and thence to the tank. The lubricating pump comprises a body casting 152 (Fig. 9) in the upper end of which is a chamber 153 that fills with oil entering by way of pipe 150 (Fig. 11). A reciprocating plunger rod 154 enters the body through a gland 155 and is provided with an annular groove 156. As the rod reciprocates the grooved part enters the chamber 153, picks up a small ring of oil and then coincides with the ends of two bores 157 and 158 (Fig. 10). Bore 157 is connected to the air pipe 15 so that immediately 156, 157 and 158 coincide air is able to blow the ring of oil into bore 158. This bore communicates with the lubricating point 159 of the compressor by means of pipes 160 and 161. By this means a small but sufficient quantity of lubricant is conveyed to the compressor. Reciprocation of the plunger rod 154 is effected by means of an eccentric 162 fixed on shaft 31 and connected to the rod 154 by means of a strap 163, a connecting rod 164 and a knuckle joint 165.

It will be seen that the unions $O_2$, $G_2$, $G_4$, $O_7$ and $FP_1$ are fixed on a manifold 166. This manifold has in it a number of vertical conduits opening into other conduits at right angles to them and coinciding with unions $O_1$, $G_1$, etc. Owing to the provision of this manifold, assembly and dismantling of the control gear is greatly facilitated.

It will be understood that any suitable number of control switches may be arranged in series with switch $SS_3$. In Fig. 12 and in Fig. 13 one such switch (167) is shown. This comprises a mercury switch controlled by the boiler or furnace temperature and may be used in conjunction with a room thermostat of known kind. A rotary converter, sparking coil or other suitable spark-generating device may be used in place of that described with reference to Fig. 13.

In some cases where a supply of electricity is not easily available spark ignition may be dispensed with and a gas flame used instead, ignition of the oil being performed either from a continuous gas jet or from a gas jet that is ignited from a continuous pilot jet, gas ignited by the pilot jet being turned on by a valve which is operated by a mechanism substantially similar to that which operates the spark switch. This gas jet will be arranged to last for a period similar to that of the spark.

Owing to the invention the plant automatically shuts down if the oil fails to ignite or if the stack switch fails to turn from "cold" to "hot" position: if the stack switch incorrectly remains in the "hot" position the gear cannot restart until the defect is corrected: and if the oil flame fails to ignite after three attempts (if water be in the oil, the burner nozzle be choked, or the spark fails) the plant shuts down pending manual attention.

In pressure jet oil firing systems the existing fuel pump FP is dispensed with, a high pressure pump, mounted where FP is now located, or where the compressor 5 (which would be dispensed with) is located, could be used instead, said high pressure pump supplying the oil cylinder 18 in much the same way as this cylinder is now supplied with air. The cylinder, when supplied with high pressure oil, would be smaller than that shown and could be replaced by a diaphragm.

The oil issuing from the burner may, if desired, be ignited directly from the spark.

What I claim is:—

1. In combination with a burner mechanism comprising an igniter, a fuel feed control means, a motor operated fuel feeding means and a circuit therefor including a normally closed motor switch, a control system comprising a combustion responsive switching means controlling initial motor operation and operable in response to the establishment of combustion to maintain motor operation independent of said motor switch, a controllable driving connection between said motor and a rotatable cam mechanism, means responsive to the operation of said feeding means effectuating said driving connection, said cam mechanism including a multiple cam body biased to an initial position and operable when partially rotated therefrom to: first render the igniter effective, second, to effectuate fuel feed, third, to terminate igniter operation, fourth, to open said motor switch and to de-energize said motor if combustion is not established whereby said driving connection is disengaged and said body returns to its initial position reclosing said motor switch to again attempt ignition of the fuel, and fifth, if combustion is established and said body continues to rotate, to disengage said driving connection and retain said body in its rotated position to maintain fuel feed.

2. In combination with a burner mechanism comprising an igniter, a fuel feed control means, a motor operated fuel feeding means and a circuit therefor including a normally closed motor switch, a control system comprising a combustion responsive switching means controlling initial motor operation and operable in response to the establishment of combustion to maintain motor operation independent of said motor switch, a controllable driving connection between said motor and a rotatable cam mechanism, means responsive to the operation of said feeding means effectuating said driving connection, said cam mechanism including a multiple cam body biased to an initial position and operable when partially rotated therefrom to: first render the igniter effective, second, to effectuate fuel feed, third, to terminate igniter operation, fourth, to open said motor switch and to de-energize said motor if combustion is not established whereby said driving connection is disengaged and said body returns to its initial position reclosing said motor switch to again attempt ignition of the fuel, and fifth, if combustion is established and said body continues to rotate, to disengage said driving connection and retain said body in its rotated position to maintain fuel feed and a timing switch mechanism actuated by said cam body limiting the repeated ignition attempts to a predetermined number.

3. In combination with a burner mechanism comprising an igniter, a fuel feed control means, a motor operated fuel and air feeding means and a circuit therefor including a normally closed motor switch, a control system comprising a combustion responsive switching means controlling initial motor operation and operable in response to the establishment of combustion to maintain motor operation independent of said motor switch, a controllable driving connection between said motor and a rotatable cam mechanism, means responsive to the operation of said feeding means effectuating said driving connection, said cam mechanism including a multiple cam body biased to an initial position and operable when partially rotated therefrom to: first render the igniter effective, second, to effectuate fuel feed, third, to terminate igniter operation, fourth, to open said motor switch and to de-energize said motor if combustion is not established whereby said driving connection is disengaged and said body returns to its initial position reclosing said motor switch to again attempt ignition of the fuel, and fifth, if combustion is established and said body continues to rotate, to disengage said driving connection and retain said body in its rotated position to maintain fuel feed and a timing switch mechanism actuated by said cam body limiting the repeated ignition attempts to a predetermined number.

4. In a combination according to claim 3, a device for limiting the rate at which said cam body returns to its initial position.

5. In a combination according to claim 3, locking mechanism associated with said motor switch, said mechanism being adapted to hold said switch in the open position until said cam body has returned substantially to its initial position.

6. In a combination according to claim 3, locking mechanism associated with said motor switch, said mechanism being adapted to hold said switch in the open position and cooperating with a cam on said body to release said switch when said body has returned substantially to its initial position.

7. In a combination according to claim 3, a timing switch mechanism including a second normally closed electric switch in the energizing circuit of said motor, a device actuated progressively from one of the cams, said device after being moved through a predetermined extent causing said second normally closed switch to open.

8. In a combination according to claim 3, a compressor included in said air feeding means, drive transmitting elements in said controllable driving connection between said motor and said rotatable cam mechanism, an air piston, an air cylinder containing said piston, a pipe connection between said cylinder and said compressor, said piston, cylinder and pipe connection being included in said means responsive to the operation of said feeding means, and a connection between said piston and one of said drive transmitting elements, the air pressure being such that when the compressor is driven by the motor, air from the compressor passes into the cylinder and displaces the piston therein and thus effects engagement of the said drive-transmitting element with a second of the drive-transmitting elements and thus causes said cam body to be turned by said motor.

9. In a combination according to claim 3, a compressor included in said air feeding means, drive transmitting elements in said controllable driving connection between said motor and said rotatable cam mechanism, an air piston, an air cylinder containing said piston, a pipe connection between said cylinder and said compressor, said piston, cylinder and pipe connection being included in said means responsive to the operation of said feeding means, and a connection between said piston and one of said drive transmitting elements, the air pressure being such that when the compressor is driven by the motor, air from the compressor passes into the cylinder and displaces the piston therein and thus effects engagement of the said drive-transmitting element with a second of the drive-transmitting elements and thus causes said cam body to be turned by said motor and a device adapted to effect disengagement of said elements, one of the cams on the drum preventing the effective functioning of the device until the body has been moved through a predetermined distance under the action of the motor.

10. In a combination according to claim 3, drive-transmitting elements included in said controllable driving connection, means adapted to effect engagement between the drive-transmitting elements, and a device adapted to effect disengagement of said elements, one of the cams on said body being adapted to prevent the effective functioning of said device until the body has moved through a predetermined distance under the action of the motor.

11. In combination according to claim 3, a thermally controlled normally open switch included in said combustion-responsive switching means, and a safety switch, said cam body when partially rotated being operable, if combustion is established, to close said safety switch whereby said motor circuit includes said thermally controlled switch and said safety switch.

12. In a combination according to claim 3, a gas valve, an electric ignition circuit, and a fuel valve, said cam body being operable when partially rotated from said initial position to open said gas valve and energize said ignition circuit, whereby gas after passing through the valve is ignited, and then to open said fuel valve whereby fuel after passing therethrough is ignited by said ignited gas.

PERCY HENRY HERRING.